No. 843,892. PATENTED FEB. 12, 1907.
J. C. HALLER & R. H. MACHELL.
PIPE JOINT.
APPLICATION FILED OCT. 21, 1905.

WITNESSES:
A. Miller
John A. Percival.

INVENTORS.
James Cracroft Haller
Robert Hope Machell

ATTORNEYS

UNITED STATES PATENT OFFICE.

JAMES C. HALLER AND ROBERT HOPE MACHELL, OF DEWSBURY, ENGLAND, ASSIGNORS TO EDWARD THEODORE INGHAM AND JOSHUA LISTER INGHAM, OF DEWSBURY, ENGLAND, A COMPANY.

PIPE-JOINT.

No. 843,892.     Specification of Letters Patent.     Patented Feb. 12, 1907.

Application filed October 21, 1905. Serial No. 283,847.

*To all whom it may concern:*

Be it known that we, JAMES CRACROFT HALLER and ROBERT HOPE MACHELL, both of Corporation Chambers, Dewsbury, in the county of York, England, have made a new or Improved Pipe-Joint, of which the following is a specification.

This invention relates to joints of earthenware pipes and the like, the principal object thereof being to produce a water-tight joint at a small cost in material and labor.

Figure 1:
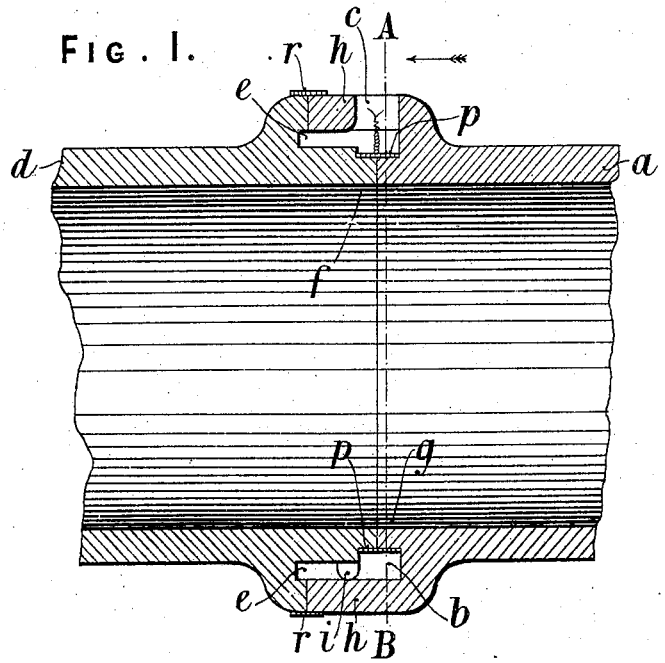
Figure 2:
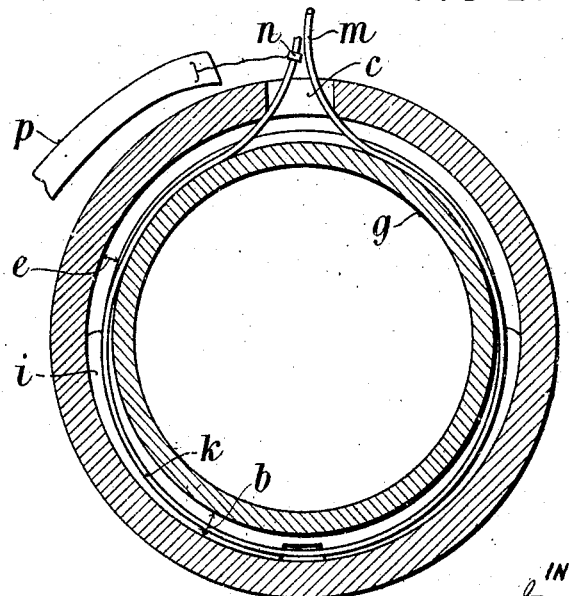

In the accompanying drawings, Figure 1 is a vertical section, and Fig. 2 is a section taken on the line A B of Fig. 1, of a joint constructed according to our invention.

The socket $a$ is provided with an annular groove $b$ and a pouring hole or holes $c$ at the top. The spigot $d$ has a smaller groove $e$ in the shoulder corresponding at its outer edge with the groove $b$ of the socket, a portion $f$ of the extremity of the spigot being reduced to the thickness and diameter of the inner rim $g$ of the socket, so that the annular space between this portion $f$ and the overlapping portion $h$ of the socket shall correspond to the width of the groove $b$. A bead $i$ on the spigot at the invert preserves the alinement.

A flexible rod $k$, Fig. 2, of cane, whalebone, or other suitable material, is inserted into the pouring-hole $c$ and pushed along the groove $b$, traveling around the same until its forward end $m$ again appears at the pouring-hole, and can be withdrawn therefrom, while at the other end $n$ of the rod $k$ a strip $p$ of canvas or other material is fastened. As the rod is withdrawn the canvas is pulled into the groove $b$ and forms a ring around the pipe-joint, as shown in Fig. 1.

The canvas $p$ may be provided at the end or ends thereof with a clasp or buckle or with copper or other wires for fastening, so that the ends of the strip of canvas can now be fastened together. Cement is then run into the grooves through the pouring-hole $c$, the canvas $p$ preventing the escape of any cement into the interior of the pipe. A temporary outer strip $r$ of canvas or leather may encircle the socket and shoulder-joint during the pouring in order to prevent any of the cement from escaping outward.

The joint made as above described can be finished while liquid stands in the pipes, has a double seal, and by means of the rim-bead insures perfect alinement and true invert, while requiring no clay or other material except the cement and canvas.

We claim—

1. A joint for earthenware and like pipes, comprising an annular groove in the butt of the socket, an annular groove in the spigot, a bead on the spigot at the invert, a reduced end on the spigot corresponding in thickness and diameter to the rim on the butt formed by said groove said reduced end forming a shoulder with which the end of the socket engages, a flexible strip surrounding the joint made by the end of the socket with the shoulder, and a cement filling, as set forth.

2. A joint for earthenware and like pipes, comprising a groove in the butt of the socket, a shoulder on the end of the spigot a groove in the shoulder of the spigot, a bead on the spigot at the invert a reduced end on said spigot corresponding in thickness and diameter to the rim on the butt formed by said groove a flexible strip surrounding the joint made thereby, securing means for said strip, a flexible strip surrounding the joint made by the end of the socket with the shoulder, and a cement filling, as set forth.

In witness whereof we have hereunto set our hands in the presence of two witnesses.

JAMES C. HALLER.
             R. HOPE MACHELL.

Witnesses:
    WM. HY. MORRIS,
    ARTHUR WALKER.